D. J. REILY.
PLANT HOLDER.
APPLICATION FILED APR. 15, 1918.
1,272,713.
Patented July 16, 1918.
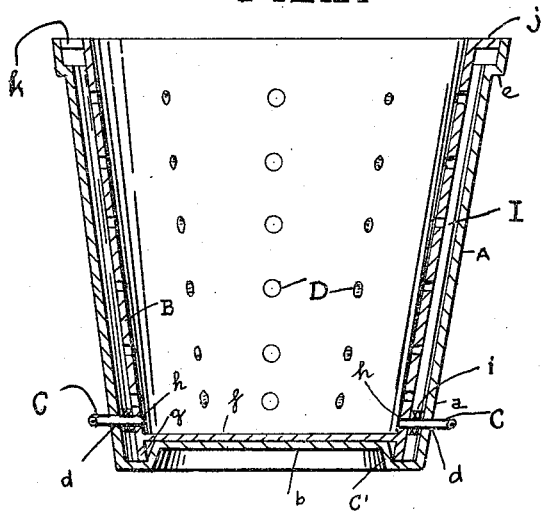
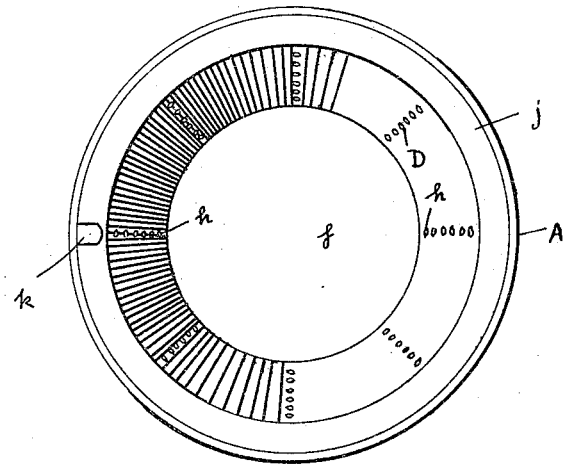
INVENTOR
D. J. REILY
BY Joseph J. O'Brien
ATTORNEY

UNITED STATES PATENT OFFICE.

DANIEL J. REILY, OF SAN FRANCISCO, CALIFORNIA.

PLANT-HOLDER.

1,272,713.  Specification of Letters Patent.  Patented July 16, 1918.

Application filed April 15, 1918. Serial No. 228,816.

*To all whom it may concern:*

Be it known that I, DANIEL J. REILY, a citizen of the United States of America, and a resident of the city and county of San Francisco and State of California, have invented certain new and useful Improvements in Plant-Holders, of which the following is a full, clear, and exact description.

This invention relates to improvements in flower pots and its leading object is the provision of a flower pot which will contain a reserve supply of water and automatically feed the same in limited quantities to the roots of the plant, while at the same time permitting air to come in direct contact with the plant roots, without danger of water leaking through the air connections.

Another object of the invention is the improvement of the details of construction of the flower pot, which consists of an inner earth and root holding vessel and an outer water holding vessel having its wall spaced from the wall of the inner vessel to provide a water holding space between the vessel walls.

With the above and other objects, combinations and constructions in view the invention consists in certain new and useful arrangements of parts, clearly described in the following specification and fully illustrated in the accompanying drawings, in which:—

Figure 1 is a vertical sectional view of my improved flower pot.

Fig. 2 is a top plan view thereof.

Referring to the accompanying drawings A designates the outer vessel and B the inner vessel. The outer vessel A is formed with a conical wall $a$ and an integral bottom $b$, which is provided with an upstanding portion $c$ of conical formation at $c'$. The vessel A is also formed with a plurality of openings $d$, located near the base thereof, and is further provided with an enlarged mouth which includes a shoulder $e$.

The inner vessel B may be provided with a bottom $f$ and is preferably formed with a pendant flange $g$, which is adapted to seat on the conical wall $c'$ of the bottom of the outer vessel A. The lower portion of the inner vessel A is formed with openings $h$ adapted to register with the openings $d$ formed in the wall of the outer vessel A. Small tubes C are disposed in the openings $d$ and $h$, with the portion extending across the space I between the opposing vessel walls protected by a packing ring $i$, so that water will not leak from the water chamber or space I. The upper edge or mouth of the inner vessel is formed with an external flange or ridge $j$ which is adapted to bear snugly against the mouth of the outer vessel, so as to make a fairly close water seal; and this external mouth flange or ridge $j$ is formed with a water inlet opening $k$, through which water may be admitted to the chamber or space I. Both the pendant flange $g$ and the mouth flange $j$ serve to maintain the inner vessel concentrically spaced within the outer vessel.

Water is permitted to flow into the inner vessel from the space or chamber I by means of small perforations or openings D formed in the wall of the inner vessel.

When earth and the roots of a plant are inserted in the inner vessel and water placed in the water chamber between the two vessels then the roots will be maintained at the proper degree of moisture and air can directly reach the roots of the plant. Should it be desired to increase the flow of water to the roots the inner vessel may be slightly lifted, so as to raise the pendant flange thereof, relatively to the conical bottom portion $c'$, so that water may flow through the bottom opening $b'$ formed in the bottom $b$, when the pendant flange has been moved away from the conical portion $c'$.

Having described my invention I claim:—

1. A plant holder consisting of an outer vessel having a bottom providing an upstanding shoulder, a vessel within the outer vessel and provided with a pendant portion engaging the shoulder of the outer vessel, whereby the inner vessel is concentrically spaced from the outer vessel to provide a water holding chamber therebetween, the upper edge portion of the inner vessel having an external flange thereon engaging the upper edge portion of the outer vessel and having an opening in said flange, the vertical walls of the outer and inner vessel having registering openings, and an air tube inserted in said openings, whereby air may reach the roots of the plant in the inner vessel, the vertical wall of the inner vessel having perforations therein to admit water from the water holding chamber between the two vessels.

2. A plant holding device consisting of an outer vessel having an upstanding base portion, an inner vessel having its wall spaced from the wall of the outer vessel to provide a water holding space therebetween, the inner vessel having a pendant flange to engage the upstanding portion of the base of the outer vessel and also provided with an opening adapted to be closed when said flange is in its lowermost position on said upstanding base portion, and air tubes extending through the walls of the vessels to admit air to the roots of the plant.

3. A plant holding device consisting of a vessel having an upstanding base portion provided with a conical surface, an inner vessel having a pendant base flange to engage the conical surface of the upstanding base portion of the first vessel, said inner vessel being spaced from the first vessel to provide a water holding chamber therebetween, the inner vessel being provided with an external flange on its upper end to snugly engage the mouth of the outer vessel, and air tubes extending through the vessels to admit air to the roots of the plant disposed in the inner vessel, the inner vessel having openings in its wall to permit the water to flow therethrough.

Signed at San Francisco, California, in the presence of two witnesses.

DANIEL J. REILY.

Witnesses:
JAS. W. DOHERTY,
E. L. KEOHANE.

Copies of this patent may be obtained for five cents each, by addressing the "Commissioner of Patents, Washington, D. C."